US012079897B2

(12) United States Patent
Bhiravabhatla et al.

(10) Patent No.: US 12,079,897 B2
(45) Date of Patent: Sep. 3, 2024

(54) VISIBILITY GENERATION IMPROVEMENTS IN TILE BASED GPU ARCHITECTURES

(71) Applicant: QUALCOMM Incorporated, San Diego, CA (US)

(72) Inventors: Kalyan Kumar Bhiravabhatla, Bengaluru (IN); Andrew Evan Gruber, Arlington, MA (US); Rahul Sunil Kukreja, Bangalore (IN); Vishwanath Shashikant Nikam, Bangalore (IN); Tao Wang, Sunnyvale, CA (US); Jian Liang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/935,031

(22) Filed: Sep. 23, 2022

(65) Prior Publication Data
US 2024/0104684 A1    Mar. 28, 2024

(51) Int. Cl.
G06T 1/20 (2006.01)
G06T 1/60 (2006.01)
(Continued)

(52) U.S. Cl.
CPC ............... G06T 1/20 (2013.01); G06T 1/60 (2013.01); G06T 15/005 (2013.01); G06T 15/405 (2013.01)

(58) Field of Classification Search
CPC ........... G06T 1/20; G06T 1/60; G06T 15/005; G06T 15/405
See application file for complete search history.

(56) References Cited

U.S. PATENT DOCUMENTS 9,087,410 B2    7/2015 Seetharamaiah et al.
9,836,810 B2    12/2017 Balci et al.
(Continued)

OTHER PUBLICATIONS

Anglada M., et al., "Early Visibility Resolution for Removing Ineffectual Computations in the Graphics Pipeline", 2019 IEEE International Symposium on High Performance Computer Architecture (HPCA), IEEE, Feb. 16, 2019, pp. 635-646, XP033532493, Abstract, Figure 1.

(Continued)

Primary Examiner — Daniel F Hajnik
(74) Attorney, Agent, or Firm — Procopio, Cory, Hargreaves & Savitch

(57) ABSTRACT

This disclosure provides systems, devices, apparatus, and methods, including computer programs encoded on storage media, for improving visibility generation in tile-based GPU architectures. A graphics processor may perform a first binning pass associated with visibility information for each of a plurality of primitives in at least one frame. The visibility information for each of the plurality of primitives may correspond to a visible indication or an invisible indication. The graphics processor may update a depth buffer based on the visibility information for all of the plurality of primitives in the at least one frame. The graphics processor may perform a second binning pass for each of the visible set of primitives based on the updated depth buffer. The graphics processor may store at least one of the updated visibility information or updated position data for all primitives in the visible set of primitives from the second binning pass.

27 Claims, 15 Drawing Sheets

(51) Int. Cl.
*G06T 15/00* (2011.01)
*G06T 15/40* (2011.01)

(56) References Cited

U.S. PATENT DOCUMENTS

| | | | |
|---|---|---|---|
| 10,796,478 | B2 | 10/2020 | Gruber |
| 11,062,506 | B2 | 7/2021 | Lauritzen et al. |
| 2004/0212614 | A1 | 10/2004 | Aila et al. |
| 2006/0232596 | A1* | 10/2006 | Barenburg .............. G06T 15/04 |
| | | | 345/581 |
| 2009/0058848 | A1 | 3/2009 | Howson |
| 2009/0073168 | A1* | 3/2009 | Jiao ....................... G06T 15/005 |
| | | | 345/426 |
| 2014/0118347 | A1 | 5/2014 | Hakura et al. |
| 2015/0187117 | A1 | 7/2015 | Balci et al. |
| 2016/0163014 | A1* | 6/2016 | Yang ..................... G06T 15/005 |
| | | | 345/502 |
| 2024/0005601 | A1* | 1/2024 | Kallio ....................... G06T 7/13 |

OTHER PUBLICATIONS

International Search Report and Written Opinion—PCT/US2023/032897—ISA/EPO—Jan. 10, 2024.

\* cited by examiner

VISIBILITY GENERATION IMPROVEMENTS IN TILE BASED GPU ARCHITECTURES

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current graphics techniques may not address wasted work in the rendering pass when the results of the binning pass may depend on the order in which the primitives enter the pipeline and the visibility tests may not remove all the invisible primitives. There is a need for improved visibility testing techniques.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may perform a first binning pass associated with visibility information for each of a plurality of primitives in at least one frame. The visibility information for each of the plurality of primitives may correspond to a visible indication or an invisible indication. Each of the plurality of primitives with the visible indication may correspond to a visible set of primitives. Each of the plurality of primitives with the invisible indication may correspond to an invisible set of primitives. The apparatus may update a depth buffer based on the visibility information for all of the plurality of primitives in the at least one frame. The apparatus may perform a second binning pass for each of the visible set of primitives based on the updated depth buffer. The second binning pass may be associated with updated visibility information for each primitive in the visible set of primitives. The updated visibility information for each primitive in the visible set of primitives may correspond to an updated visible indication or an updated invisible indication. The apparatus may store at least one of the updated visibility information or updated position data for all primitives in the visible set of primitives from the second binning pass.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
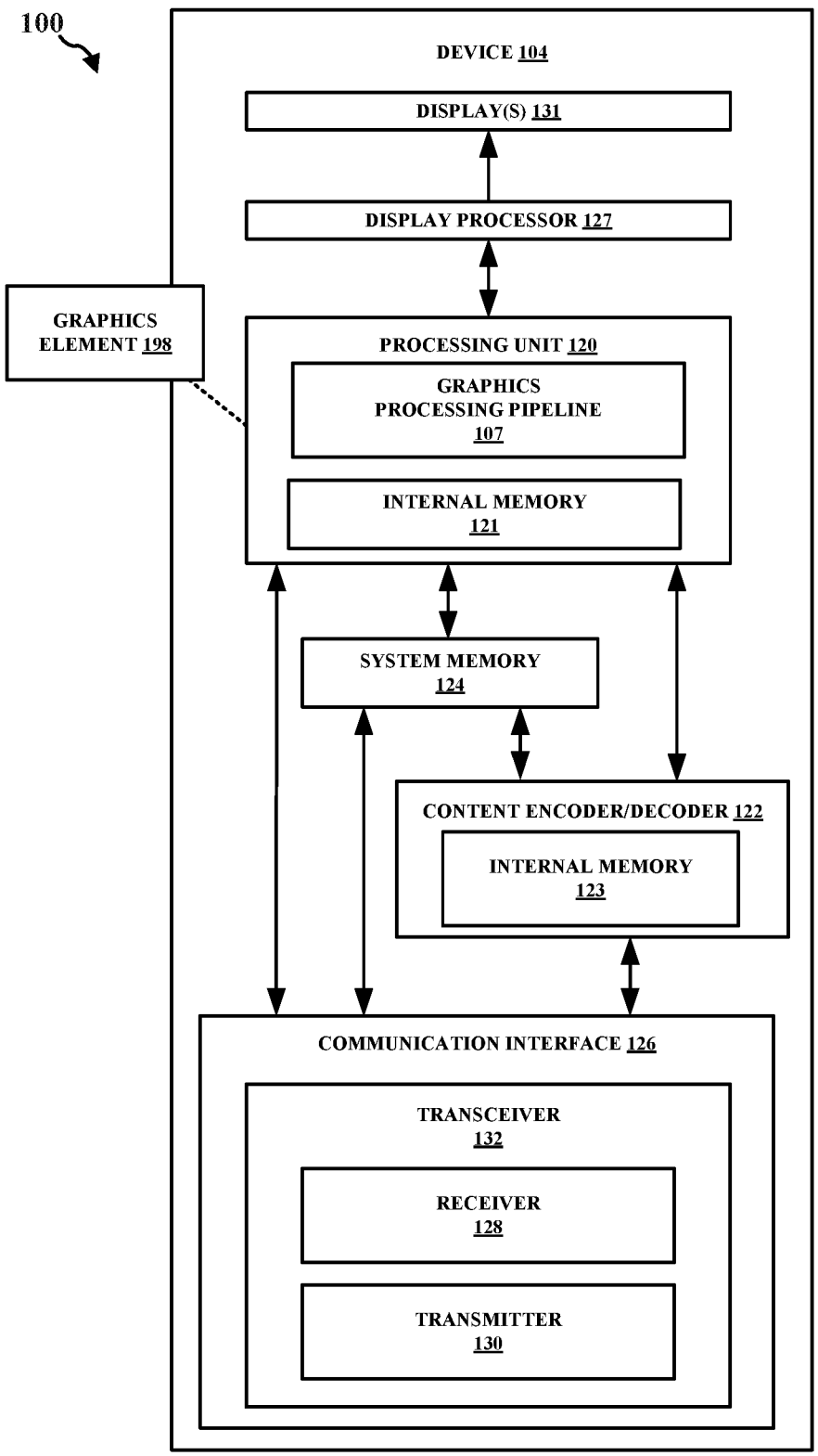
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory).

Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

Tile-based architectures may be used for the GPU to save bandwidth and improve performance and power efficiency. Typical tile-based architectures may involve two passes: 1) a bin visibility pass (also referred to hereinafter as a binning pass) that includes streaming the geometry positions (e.g., vertices) into the GPU, where triangle level visibility tests may be performed and low resolution Z (LRZ) buffer and the visibility buffer may be primed, and then the triangles may be sorted into various bins with the visibility information recorded, and 2) a bin rendering pass where the visibility information may be used to render multiple bins by taking one screen space bin at a time.

A binning pass may include performing visibility tests on primitives (e.g., triangles). Examples of the visibility tests may include view frustrum tests that may check if a primitive is completely outside the viewport (a viewable area (expressed in rendering device-specific coordinates). Further examples of the visibility tests may include backface culling tests that may check if a primitive is back-facing so that it can be discarded. Many other tests may also be used to check if the primitive generates any samples. In some configurations, coarse or detailed Z buffer-based tests may be performed to discard the primitives (e.g., triangles) if the primitives happen to be behind already rendered primitives (Z buffer-based tests may also be referred to as hidden surface removal). The one-pass binning architecture may be associated with various advantages. The advantages may include, for example, a minimum write bandwidth for the binning pass, concurrent pipelines for binning and rendering, simple visibility buffer management, and easy switching between the direct mode and the binning mode, etc.

The hidden surface removal techniques may be especially useful in generating better visibility in the binning pass because any primitives that are behind the visible screen area may be rejected (e.g., removed) early. As a result, some operations that otherwise would be performed in the bin rendering pass may be avoided without any negative consequence. Although these techniques may reject primitives that are otherwise hidden, they may be heavily dependent on the order in which the primitives are received into the GPU pipeline (e.g., front to back rendering or back to front rendering). Many workloads may include a significant percentage of primitives that get rejected (because the primitives are not actually visible) in the bin rendering pass (e.g., using the Z-buffer created in the binning pass) instead of in the binning pass due to this limitation. The failure to reject these primitives early in the binning pass may result in wasted work (which may be associated with wasted vertex shader or vertex bandwidth) in the bin rendering pass. Further, to scale the one-pass binning architecture, concurrency, the geometry pipeline, and the pixel pipeline may be considered. The one-pass binning architecture may also be associated with a high software complexity.

Aspects of the disclosure may relate to architectural techniques for improving visibility generation in the binning pass so that more triangles that are hidden behind the visible surface may be rejected in the binning pass irrespective of the order in which the triangles are received into the GPU.

In some configurations, a two-pass approach in binning may be used, where in the first pass, the geometry positions may be streamed into the GPU. Then, the vertex shading and the visibility tests may be performed on triangles, including the coarse (low resolution Z (LRZ))/fine depth buffer updates. During the first pass the visibility of the triangles may be recorded. Further, a second pass in binning may be performed, where the visibility information from the first pass may be used and the visible triangles as determined in the first pass may be visited (in other words, the invisible triangles as determined in the first pass may not be visited in the second pass). In the second pass, the visible triangles from the first pass may be tested again against already existing coarse/fine depth buffers. Any triangle that is completely behind the existing depth buffer may be rejected. During the second pass, visibility recording may be performed so that updated visibility data that removes the hidden triangles may be made available to the bin rendering pass.

After the second binning pass, the bin rendering pass may remain the same (e.g., as illustrated at the render pipeline 432 in FIG. 4), where the bin rendering pass may read the updated visibility data and render the triangles that are deemed visible after the second binning pass.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a graphics element 198 configured to perform a first binning pass associated with visibility information for each of a plurality of primitives in at least one frame. The visibility information for each of the plurality of primitives may correspond to a visible indication or an invisible indication. Each of the plurality of primitives with the visible indication may correspond to a visible set of primitives. Each of the plurality of primitives with the invisible indication may correspond to an invisible set of primitives. The graphics element 198 may be configured to update a depth buffer based on the visibility information for all of the plurality of primitives in the at least one frame. The graphics element 198 may be configured to perform a second binning pass for each of the visible set of primitives based on the updated depth buffer. The second binning pass may be associated with updated visibility information for each primitive in the visible set of primitives. The updated visibility information for each primitive in the visible set of primitives may correspond to an updated visible indication or an updated invisible indication. The graphics element 198 may be configured to store at least one of the updated visibility information or updated position data for all primitives in the visible set of primitives from the second binning pass. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
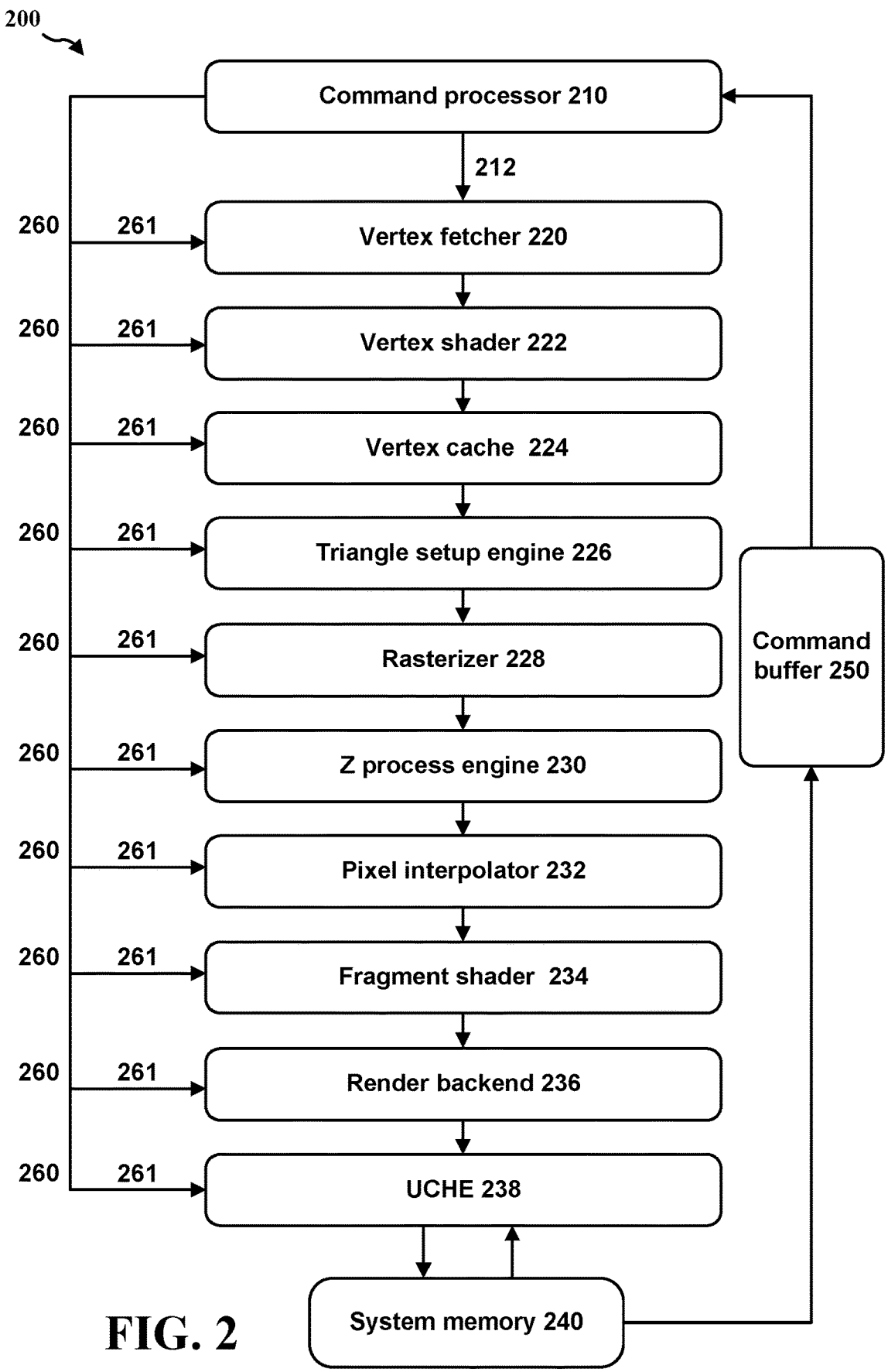
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified. In contrast to tiled rendering, direct rendering does not divide the frame into smaller bins or tiles. Rather, in direct rendering, the entire frame is rendered at a single time. Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
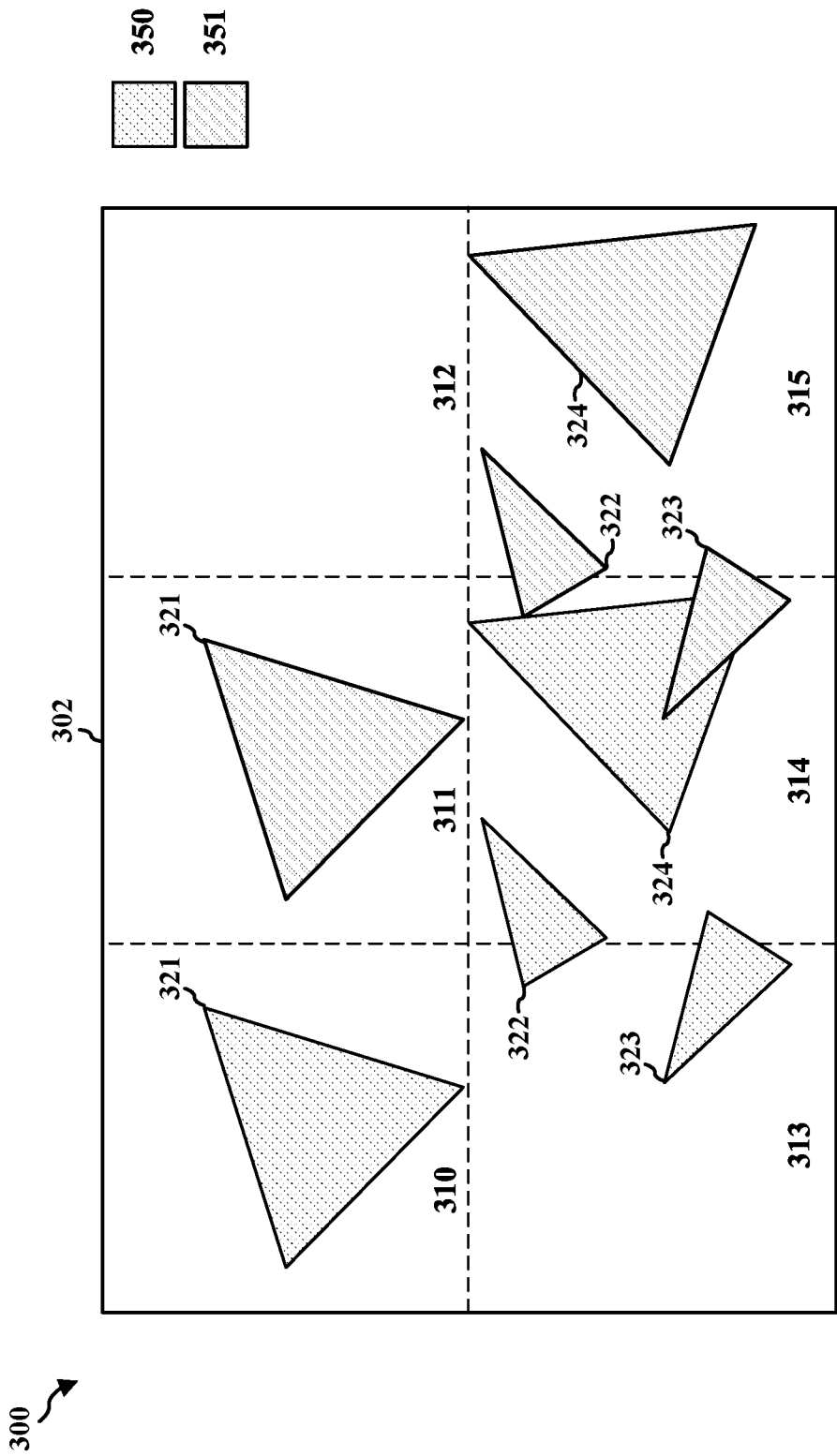
FIG. 3 illustrates an example image or surface in accordance with one or more techniques of this disclosure.

FIG. 3 illustrates image or surface 300, including multiple primitives divided into multiple bins in accordance with one or more techniques of this disclosure. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

Figure 4:
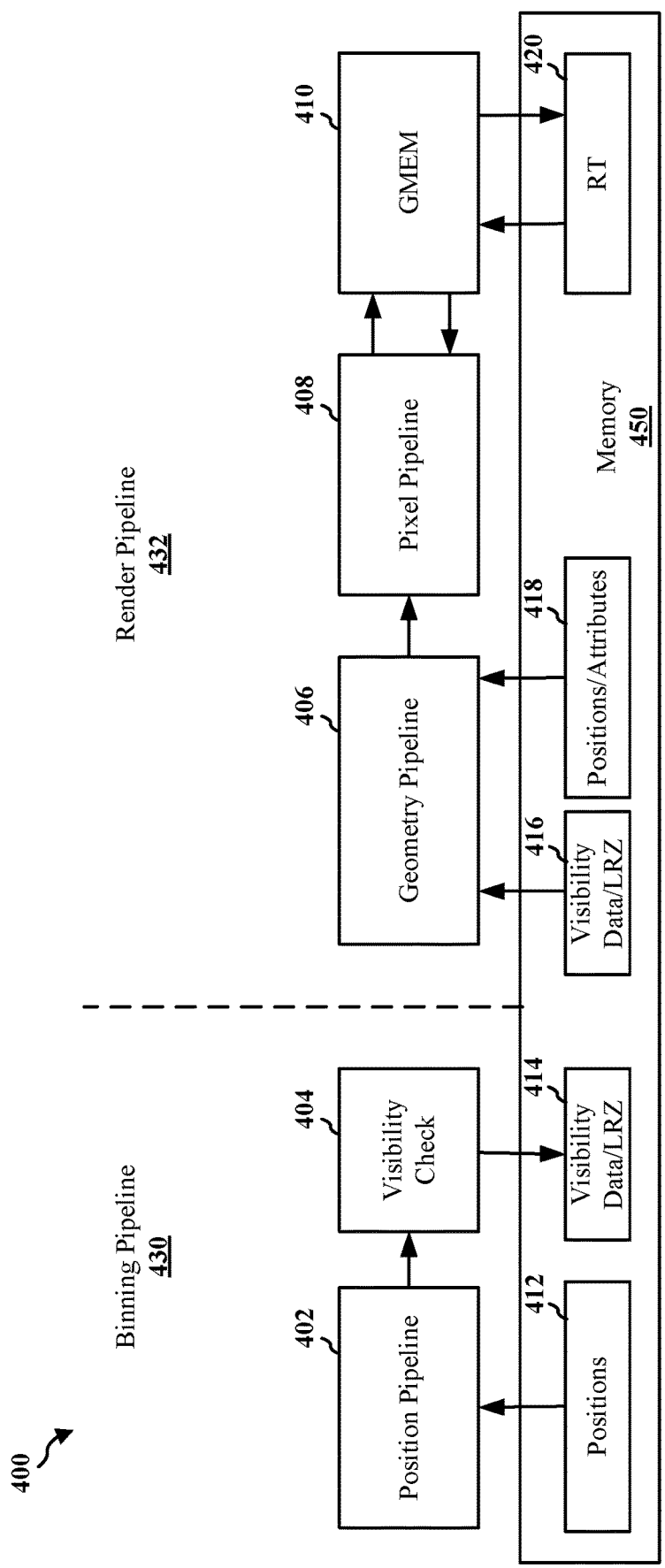
FIG. 4 is a diagram illustrating an example dataflow associated with a one-pass binning technique.

FIG. 4 is a diagram illustrating an example dataflow 400 associated with a one-pass binning technique. The operations of the binning pipeline 430 and the render pipeline 432 may be performed at a GPU (e.g., the processing unit 120). In the binning pipeline 430, the position pipeline 402 may read the positions 412 associated with the triangles. The position pipeline may then perform the visibility check 404 (e.g., visibility testing as described above) to determine whether each of the triangles is visible. The results of the visibility check 404 may be the visibility data/LRZ buffer 414. The positions 412 and the visibility data/LRZ buffer 414 may be stored in the memory 450 (e.g., DDR/main memory).

In the render pipeline 432, the GPU may render a bin. In particular, the visibility data/LRZ buffer 416 and the positions/attributes 418, which may be stored in the memory 450, may correspond to the visibility data/LRZ buffer 414 and the positions 412 in the binning pipeline 430. The geometry pipeline, which may involve vertex shading and/or per-primitive shading and culling, may read the visibility data/LRZ buffer 416 and the positions/attributes 418. The output of the geometry pipeline 406 may be fed into the pixel pipeline. The pixel pipeline 408 may perform per-pixel tests and operations (e.g., depth tests, pixel blending, etc.) and programmable shading and lighting before outputting the final color. The pixel pipeline 408 may read data from or store data to the GMEM 410. Further, the GMEM 410 may exchange data with the memory 450 via the render target (RT) 420.

Aspects of the disclosure may relate to architectural techniques for improving visibility generation in the binning pass so that more triangles that are hidden behind the visible surface may be rejected in the binning pass irrespective of the order in which the triangles are received into the GPU.

In some configurations, a two-pass approach in binning may be used, where in the first pass, the geometry positions may be streamed into the GPU. Then, the vertex shading and the visibility tests may be performed on triangles, including the coarse (LRZ)/fine depth buffer updates. Herein a depth buffer may be a memory resident buffer where the latest depth values may be stored, either on a per-pixel basis or on a block-of-pixels basis. During the first pass the visibility of the triangles may be recorded. Further, a second pass in binning may be performed, where the visibility information from the first pass may be used and the visible triangles as determined in the first pass may be visited (in other words, the invisible triangles as determined in the first pass may not be visited in the second pass). In the second pass, the visible triangles from the first pass may be tested again against already existing coarse/fine depth buffers. Any triangle that is completely behind the existing depth buffer may be rejected. During the second pass, visibility recording may be performed so that updated visibility data that removes the hidden triangles may be made available to the bin rendering pass.

After the second binning pass, the bin rendering pass may remain the same (e.g., as illustrated at the render pipeline 432 in FIG. 4), where the bin rendering pass may read the updated visibility data and render the triangles that are deemed visible after the second binning pass. The software-based two-pass binning technique may be associated with minimal hardware changes, as long as the binning pipeline supports visibility checks. Further, because the binning pipeline may be concurrent with the render pipeline, the time associated with the additional binning pass may be hidden behind the rendering passes (e.g., the rendering pass for a previous frame).

Figure 5:
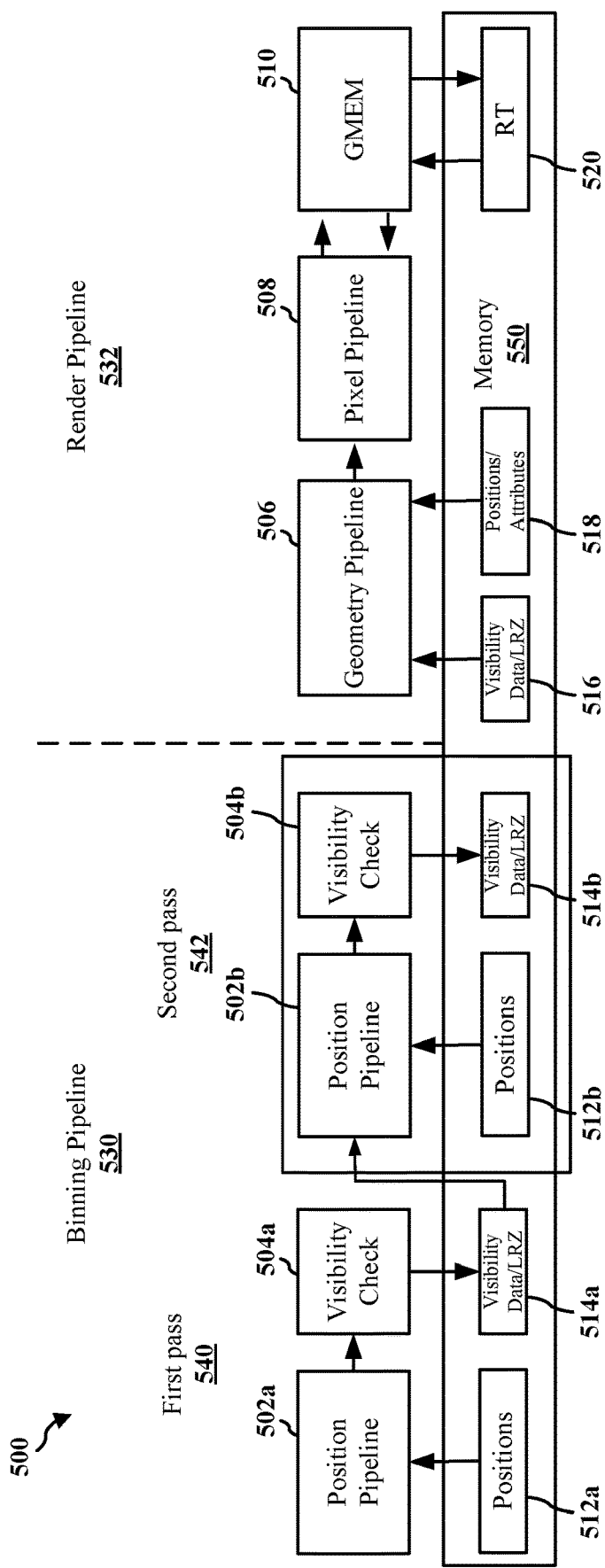
FIG. 5 is a diagram illustrating an example dataflow associated with a two-pass binning technique according to one or more aspects.
Figure 6:
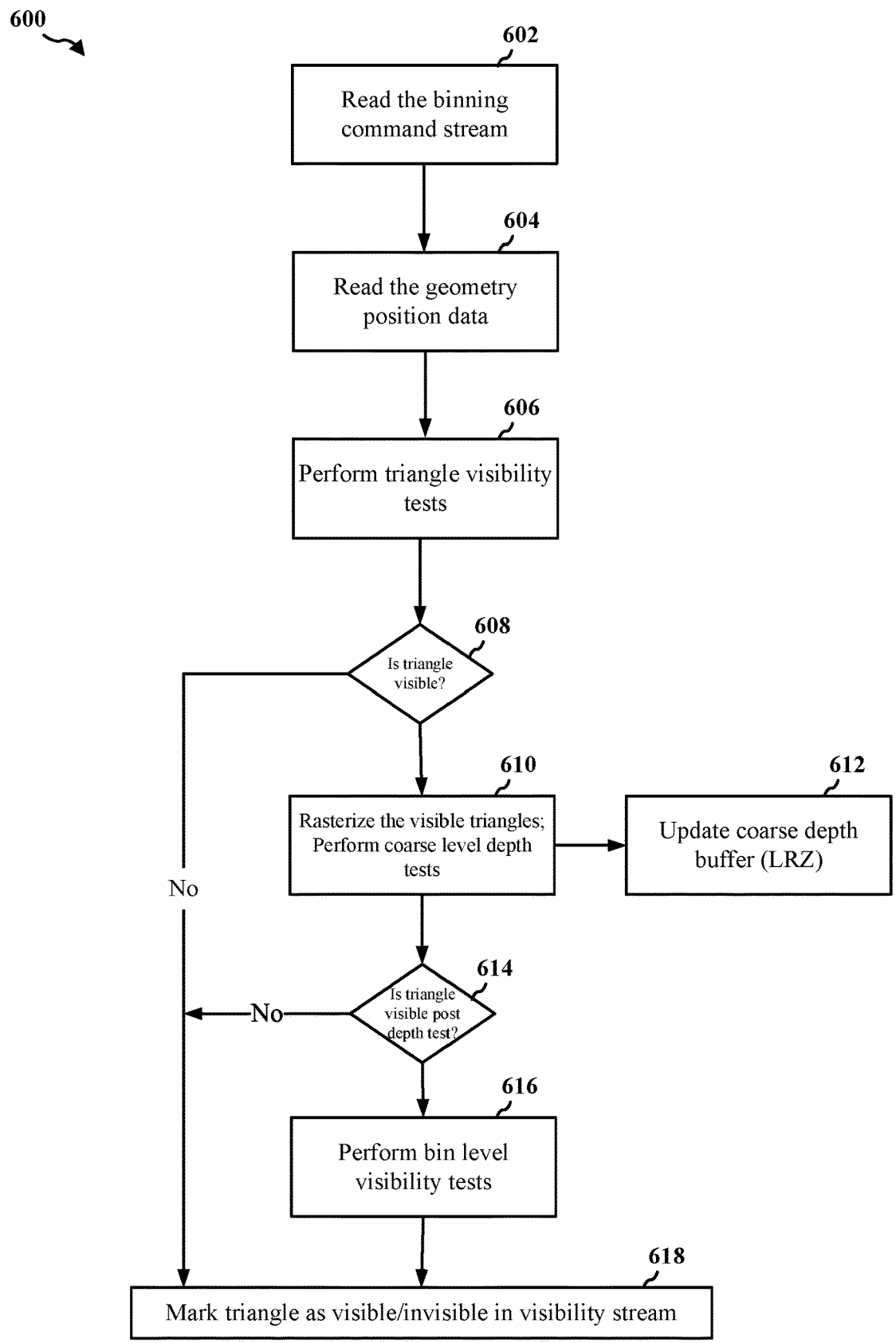
FIG. 6 an example flowchart illustrating a first binning pass in two-pass binning according to one or more aspects.
Figure 7:
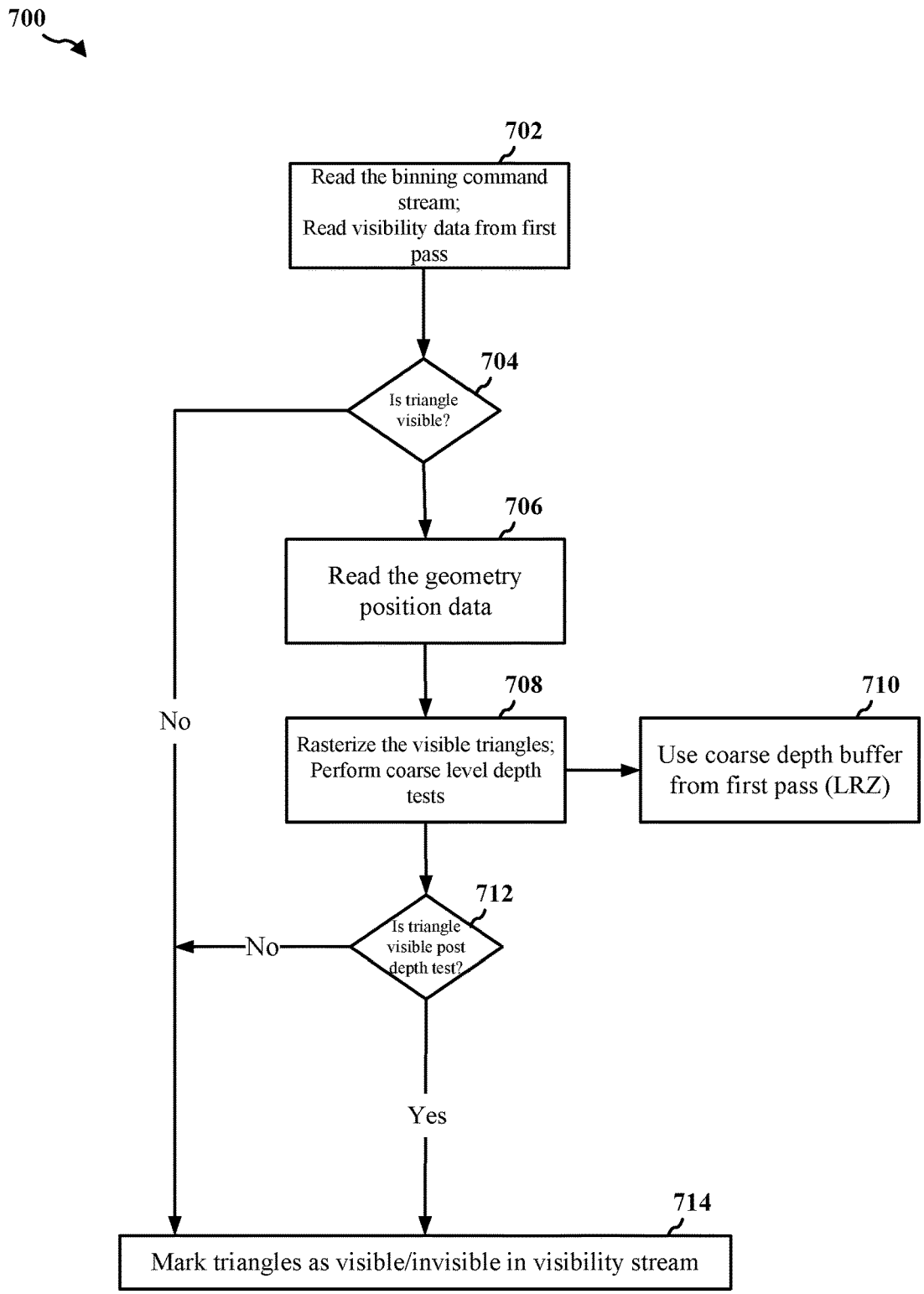
FIG. 7 is an example flowchart illustrating a second binning pass in two-pass binning according to one or more aspects.

FIG. 5 is a diagram illustrating an example dataflow 500 associated with a two-pass binning technique according to one or more aspects. FIG. 6 is an example flowchart 600 illustrating a first binning pass in two-pass binning according to one or more aspects. FIG. 7 is an example flowchart 700 illustrating a second binning pass in two-pass binning according to one or more aspects. The operations may be performed at a GPU (e.g., the processing unit 120). As shown, in the first binning pass 540 in the binning pipeline 530, at 602, the GPU may read the binning command stream. At 604, the GPU (e.g., the position pipeline 502*a*) may read the position data 512*a* (e.g., positions associated with one or more triangles). At 606, the GPU (e.g., the position pipeline 502*a*) may perform triangle visibility tests (visibility check 504*a*) (e.g., view frustrum tests, backface cull, scissor and zero pixel tests (i.e., no screen space pixel covered by a triangle), etc.). At 608, the GPU may determine whether each of the triangles is visible. The GPU may, at 618, mark invisible triangles as such in the visibility stream (e.g., the visibility data/LRZ buffer 514*a*). For visible triangles identified at 608, at 610, the GPU may rasterize the visible triangles and may perform coarse level depth tests. At 612, the GPU may update the coarse depth buffer (e.g., LRZ buffer) (e.g., the visibility data/LRZ buffer 514*a*). At 614, the GPU may determine whether each of the remaining triangles is still visible after the depth tests at 610. The GPU may, at 618, mark triangles that are invisible after the depth tests at 610 as such in the visibility stream. For the triangles that are still visible after the depth tests at 610, at 616, the GPU may perform bin level visibility tests (e.g., the GPU may sort the visible triangles into different bins and identify the still visible triangles in the bins). At 618, the GPU may mark the remaining visible triangles as such in the visibility stream. The position data 512*a* and the visibility data/LRZ buffer 514*a* may be stored in the memory 550 (e.g., a DDR/main memory).

In the second binning pass 542 in the binning pipeline 530, at 702, the GPU may read the binning command stream, and may (e.g., at the position pipeline 502*b*), read the visibility data (e.g., the visibility data/LRZ buffer 514*a*) from the first binning pass 540. At 704, the GPU may perform the visibility check 504*b*, and may determine, for each of the visible triangles from the first binning pass, whether the triangle is visible. The GPU may, at 714, mark invisible triangles identified at 704 as such in the visibility stream. For visible triangles identified at 704, at 706, the GPU may read the geometry position data 512*b*. At 708, the GPU may rasterize the visible triangles and many perform coarse level depth tests. At 710, the GPU may update the coarse depth buffer (e.g., LRZ buffer) from the first binning pass 540 (e.g., the visibility data/LRZ buffer 514*b*). At 712, the GPU may determine whether each of the remaining triangles is still visible after the depth tests at 708. The GPU may, at 714, mark triangles that are invisible after the depth tests at 708 as such in the visibility stream. At 714, the GPU may mark the remaining visible triangles as such in the visibility stream. The position data 512*b* and the visibility data/LRZ buffer 514*b* may be stored in the memory 550.

The render pipeline 532 may be similar to the render pipeline 432 in FIG. 4. For example, the geometry pipeline 506, the pixel pipeline 508, the GMEM 510, the visibility data/LRZ buffer 516, the positions/attributes 518, and the RT 520 may be similar to the geometry pipeline 406, the pixel pipeline 408, the GMEM 410, the visibility data/LRZ buffer 416, the positions/attributes 418, and the RT 420 in FIG. 4, respectively. In other words, the bin rendering pass may be performed as normal based on the output from the second binning pass 542. The visibility data/LRZ buffer 416 and the positions/attributes 418 may be stored in the memory 550, and may correspond to the visibility data/LRZ buffer 514*b* and the position data 512*b*, respectively.

In some configurations, an intermediate storage structure may be implemented within the GPU. The storage structure may store the position data after visibility checks are performed in the first binning pass. This geometry buffer may keep accumulating all the visible triangle information until all the geometry is streamed and coarse/fine depth buffers are updated. Once all the geometry for the surface is processed or if the geometry buffer becomes full, the stored visible geometry may be replayed (e.g., processed again in the binning pipeline) to check again for visibility based on the updated coarse/fine depth buffer. Any triangles that were previously visible and have since been overwritten by later geometry may now fail the depth visibility test. The visibility stream may be updated accordingly. Because the position data associated with the visible triangles as identified in the first binning pass may be stored in the hardware intermediate storage, the vertex fetch and vertex shading operations may be bypassed in the second binning pass, and the second binning pass may directly use the position data stored in the hardware intermediate storage. This hardware approach may be suitable or desirable when the GMEM at the GPU is sufficiently large (as part of the GMEM may be used as the intermediate storage structure).

The bin rendering pass may use the visibility stream from the second binning pass so that those triangles that pass visibility tests in both binning passes may be taken up for the bin rendering pass. The triangles that fail the visibility tests in the second binning pass may not be taken up for the bin rendering pass.

Figure 8:
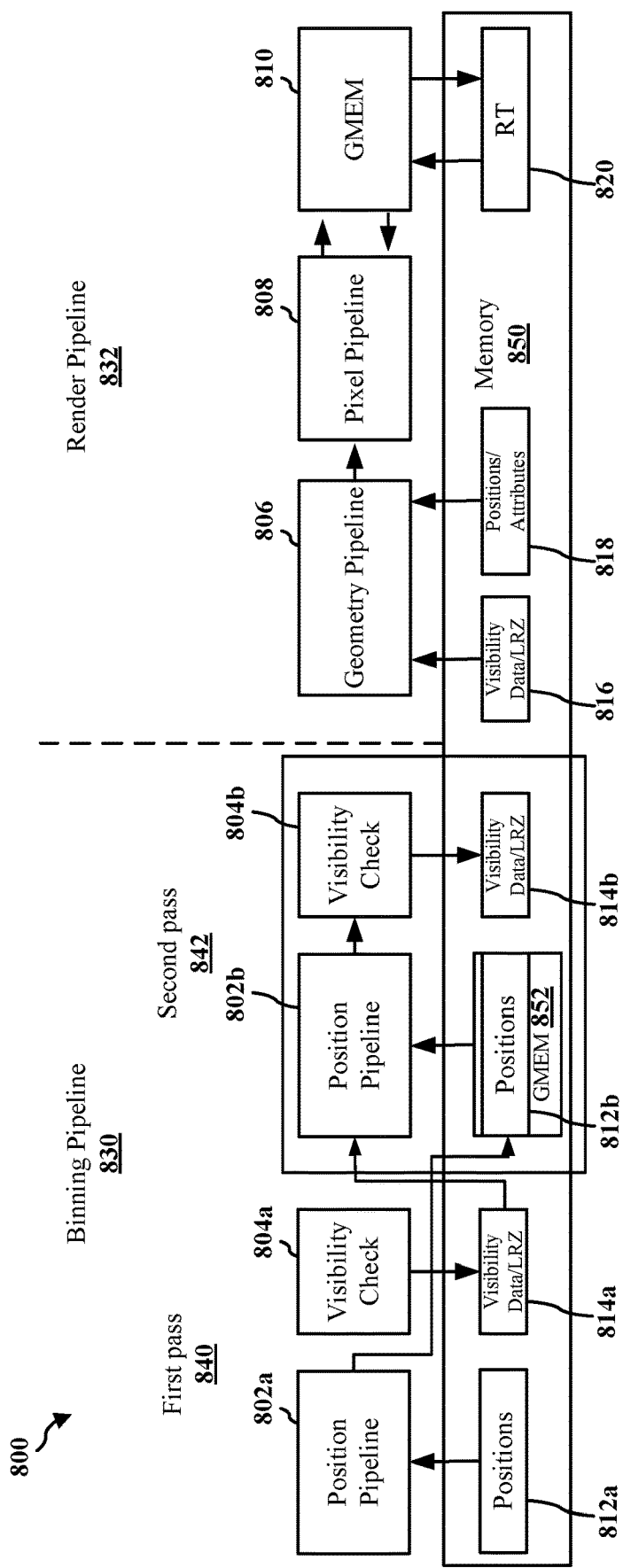
FIG. 8 is a diagram illustrating an example dataflow associated with a two-pass binning technique using on-chip storage according to one or more aspects.
Figure 9:
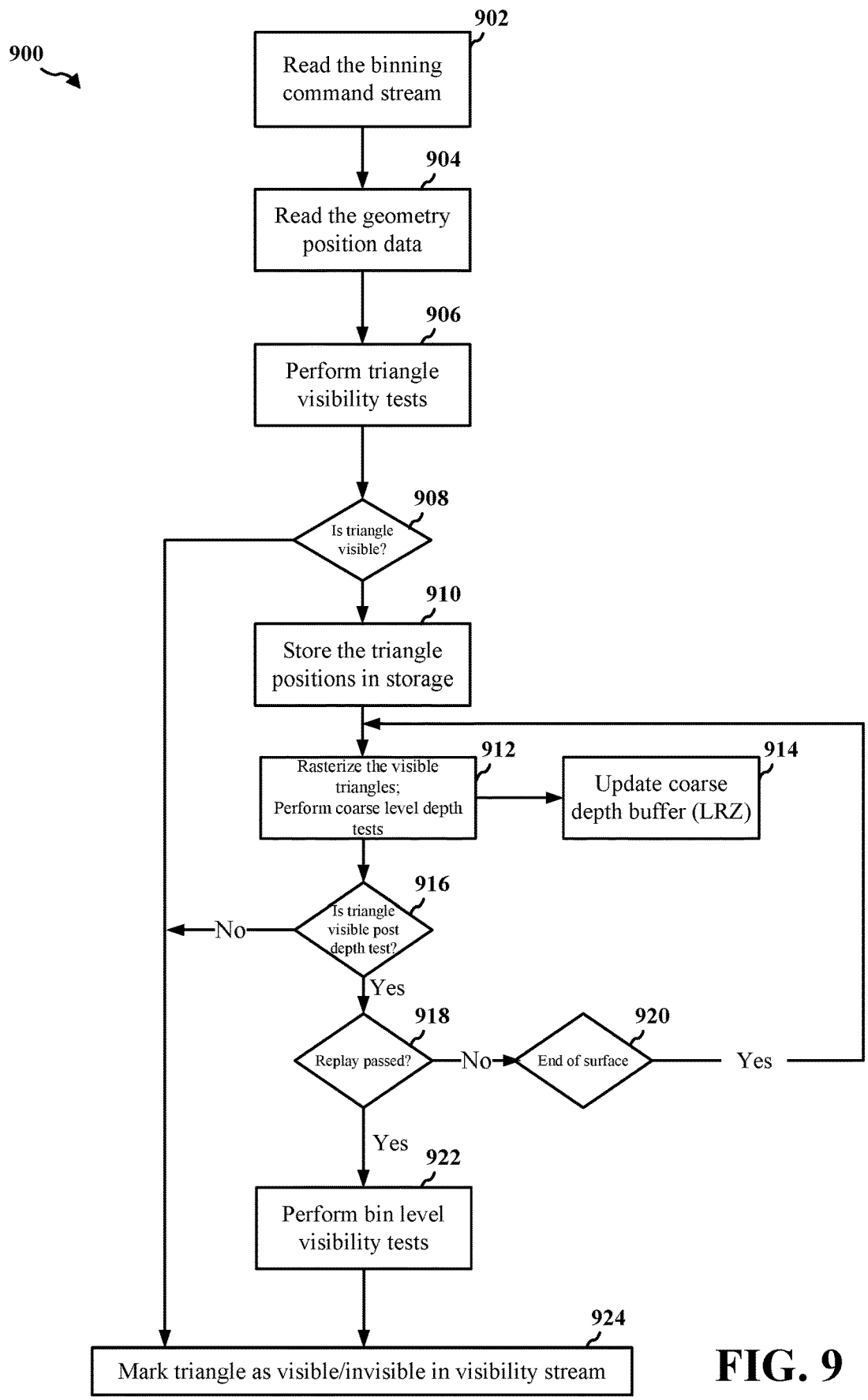
FIG. 9 is an example flowchart illustrating a two-pass binning technique using on-chip storage according to one or more aspects.

FIG. 8 is a diagram illustrating an example dataflow 800 associated with a two-pass binning technique using on-chip storage according to one or more aspects. FIG. 9 is an example flowchart 900 illustrating a two-pass binning technique using on-chip storage according to one or more aspects. The operations may be performed at a GPU (e.g., the processing unit 120). As shown, in the first binning pass 840 in the binning pipeline 830, at 902, the GPU may read the binning command stream. At 904, the GPU (e.g., at the position pipeline 802*a*) may read the geometry position data 812*a* (e.g., geometry position data associated with one or more triangles). At 906, the GPU may perform triangle visibility tests (e.g., the visibility check 804*a*) (e.g., view frustrum tests, backface cull, scissor and zero pixel tests, etc.). At 908, the GPU may determine whether each of the triangles is visible. The GPU may, at 924, mark invisible triangles as such in the visibility stream. For visible triangles identified at 908, at 910, the GPU may store the position data 812b (e.g., the positions of these triangles) in a storage (e.g., an on-chip storage, such as GMEM 852). At 912, the GPU may rasterize the visible triangles and may perform coarse level depth tests. At 914, the GPU may update the coarse depth buffer (e.g., LRZ buffer) (e.g., the visibility data/LRZ buffer 814a). At 916, the GPU may determine whether each of the remaining triangles is still visible after the depth tests at 912. The GPU may, at 924, mark triangles that are invisible after the depth tests at 912 as such in the visibility stream. For triangles that are still visible after the depth tests at 912 (the position data 812b associated with these triangles may be stored in the intermediate on-chip storage, such as the GMEM 852), in the second binning pass 842, at 918, the GPU (e.g., the position pipeline 802b) may replay the stored geometry to check again for visibility (e.g., the visibility check 804b) based on the updated depth buffer. For triangles that have passed the replay check at 918, at 922, the GPU may perform bin level visibility tests. At 924, the GPU may mark the remaining visible triangles as such in the visibility stream (e.g., the visibility data/LRZ buffer 814b). Once all triangles of a particular surface have been processed, as determined at 920, the process may return to 912. The position data 812a and the visibility data/LRZ buffer 814a and 814b may be stored in the memory 850 (e.g., a DDR/main memory).

The render pipeline 832 may be similar to the render pipeline 432 in FIG. 4. For example, the geometry pipeline 806, the pixel pipeline 808, the GMEM 810, the visibility data/LRZ buffer 816, the positions/attributes 818, and the RT 820 may be similar to the geometry pipeline 406, the pixel pipeline 408, the GMEM 410, the visibility data/LRZ buffer 416, the positions/attributes 418, and the RT 420 in FIG. 4, respectively. In other words, the bin rendering pass may be performed as normal based on the output from the second binning pass 842. The visibility data/LRZ buffer 816 and the positions/attributes 818 may correspond to the visibility data/LRZ buffer 814b and the position data 812b, respectively, and may be stored in the memory 850.

In some aspects described above, two binning passes may be used: A first binning pass may be used to generate coarse/fine depth buffers and a second binning pass may include visibility checks using the updated depth buffers. With the above aspects, the visible geometry may be visited twice to obtain a better visibility stream. In some further aspects, the visibility information of the previous frame may be used to obtain the better visibility stream for the current frame.

In most of the games and benchmarks, the scenes may show minimal changes in dynamic geometry from frame to frame. A minor portion of the geometry that was previously visible (e.g., in the previous frame) may become invisible in the next frame, and vice versa.

Accordingly, in some configurations, first, the binning pipeline may be enhanced to add the capability of accepting and processing visibility data. In the first binning pass, the triangles that were marked as visible in the previous frame may be tested for visibility using the camera/viewport parameters of the current frame. The coarse/fine depth buffer may be updated accordingly. It may happen that some triangles that were previously visible may become invisible in the current frame. Once the perceived visible triangles have been processed using the camera/viewport position of the current frame to update the coarse depth buffer, a second binning pass may process the triangles that were marked as invisible in the previous frame.

As the camera parameters of the current frame are used, some of the triangles that were marked as invisible in the previous frame may become visible, but most of the triangles that were marked as invisible may remain invisible in the current frame as in the previous frame. A visibility stream may be recorded for both passes. Because the depth buffer may be updated with the likely visible triangles, triangles that are behind the visible triangles may be rejected. Accordingly, efficient visibility information may be obtained at the end of the second pass.

A bin rendering pass may use the data from both visibility streams to process the triangles that are specified to be rendered for the final render targets. The approach that makes use of the visibility information from the previous frame may be beneficial when the visibility frame for the previous frame is optimal. Therefore, in some configurations, an initial two-pass binning mechanism (e.g., the techniques described above in relation to FIGS. 5-9) may be used on the first frame following a scene change.

Figure 10:
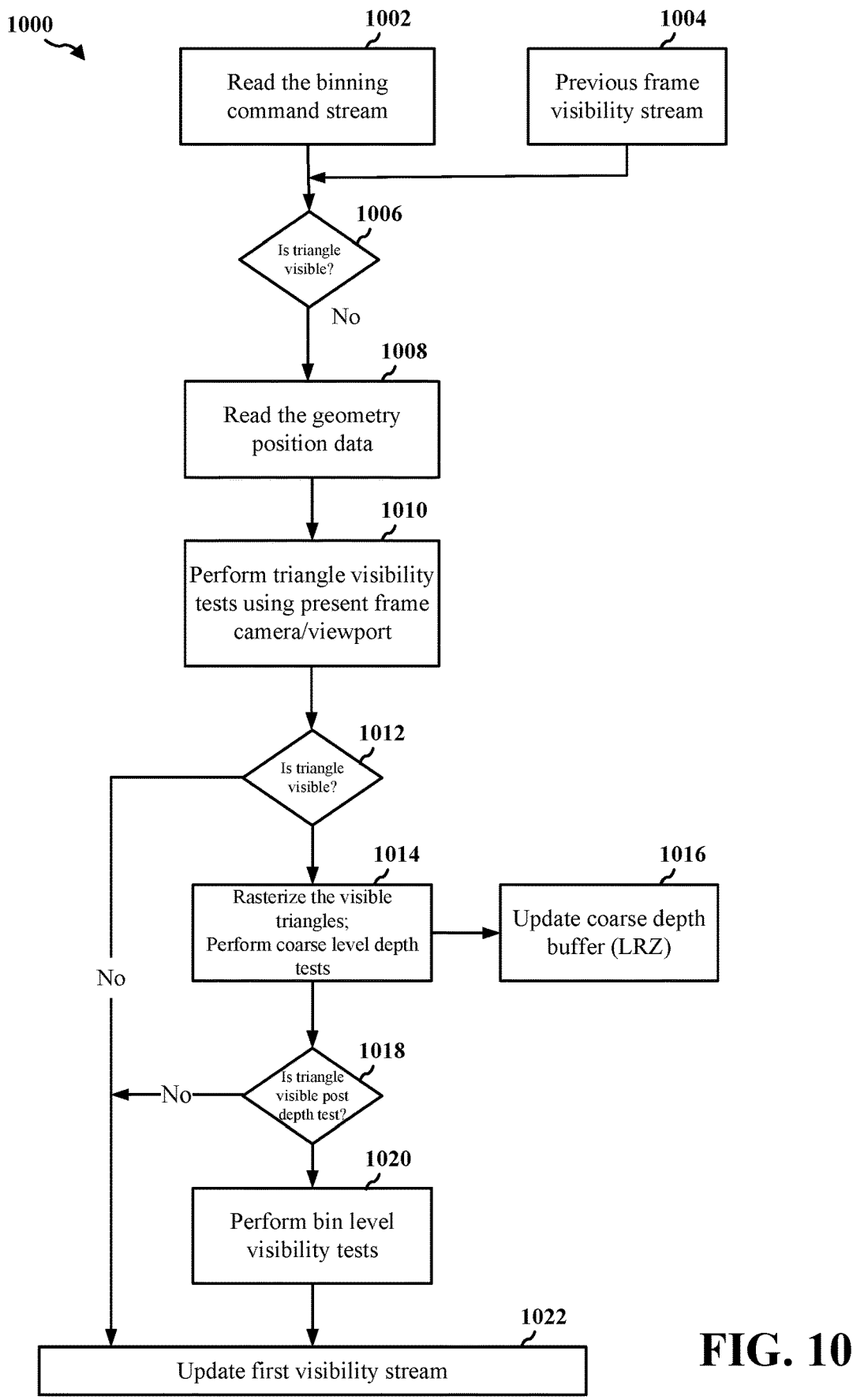
FIG. 10 is a diagram illustrating an example flowchart for a first binning pass in a two-pass binning process that utilizes visibility information of a previous frame according to one or more aspects.
Figure 11:
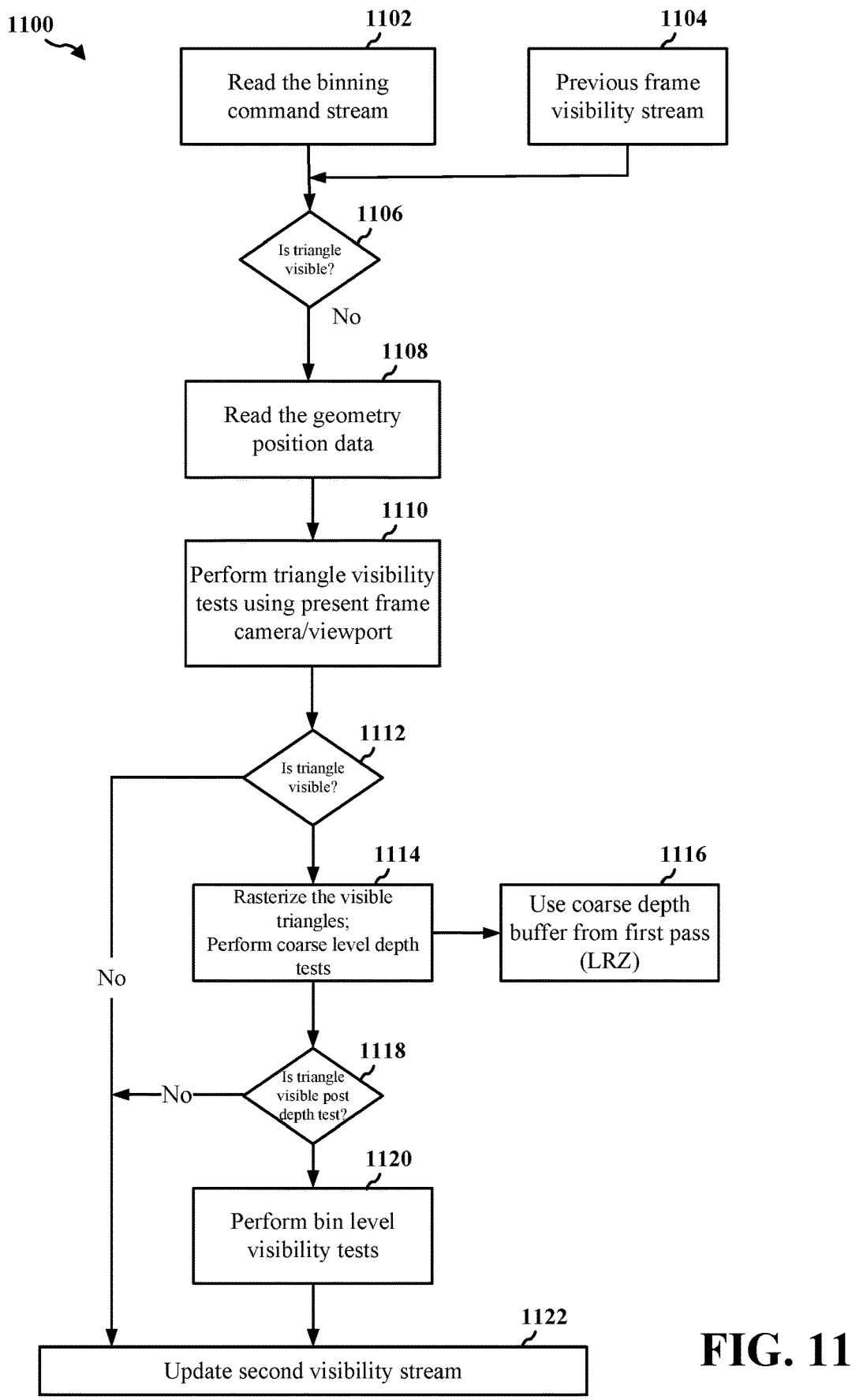
FIG. 11 is a diagram illustrating an example flowchart for a second binning pass in a two-pass binning process that utilizes visibility information of a previous frame according to one or more aspects.
Figure 12:
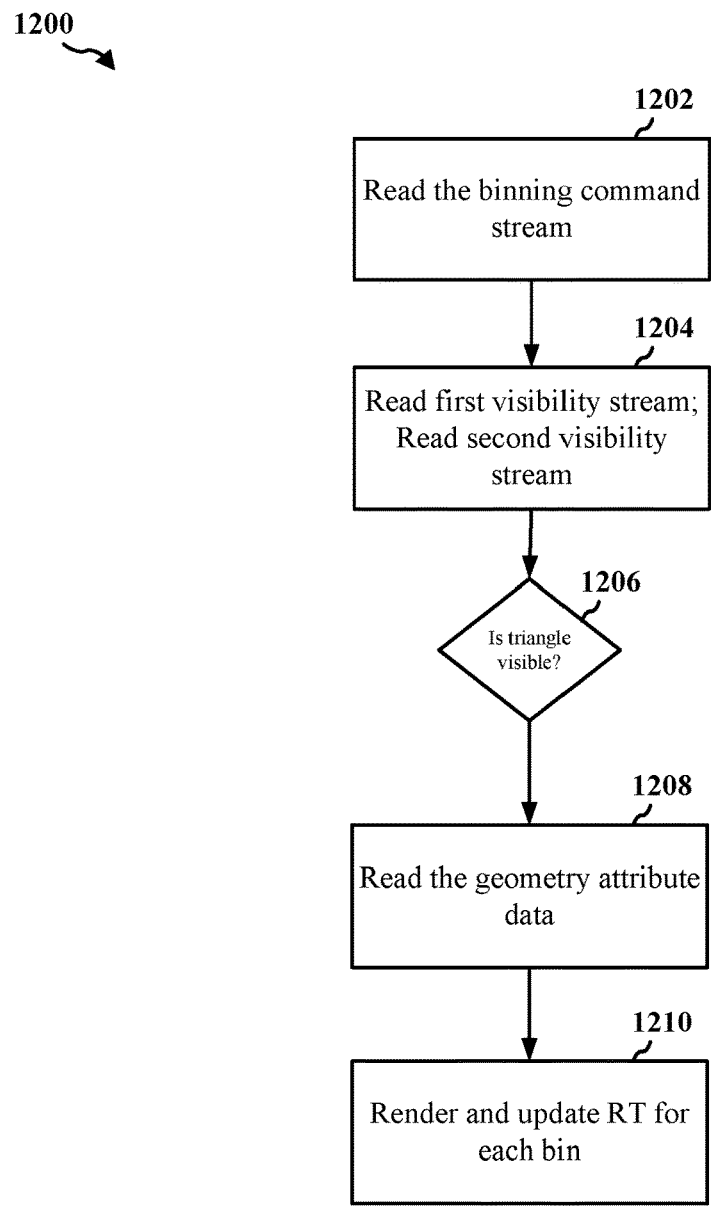
FIG. 12 is a diagram illustrating an example flowchart for a bin rendering pass where a two-pass binning process that utilizes visibility information of a previous frame is implemented according to one or more aspects.

FIG. 10 is a diagram illustrating an example flowchart 1000 for a first binning pass in a two-pass binning process that utilizes visibility information of a previous frame according to one or more aspects. FIG. 11 is a diagram illustrating an example flowchart 1100 for a second binning pass in a two-pass binning process that utilizes visibility information of a previous frame according to one or more aspects. FIG. 12 is a diagram illustrating an example flowchart 1200 for a bin rendering pass where a two-pass binning process that utilizes visibility information of a previous frame is implemented according to one or more aspects. The operations may be performed at a GPU (e.g., the processing unit 120). As shown, at 1002, the GPU may read the binning command stream. At 1004, the GPU may retrieve the visibility stream of the previous frame. At 1006, the GPU may determine whether each of the triangles was visible in the previous frame. For triangles that were visible in the previous frame, at 1008, the GPU may read the geometry position data. At 1010, the GPU may perform triangle visibility tests (e.g., view frustrum tests, backface cull, scissor and zero pixel tests, etc.) using the camera/viewport of the present frame. At 1012, the GPU may determine if each of triangles that were visible in the previous frame is visible in the current frame. The GPU may, at 1022, mark triangles that have become invisible in the current frame as such and may update a first visibility stream accordingly. For triangles that are still visible in the current frame, as identified at 1012, at 1014, the GPU may rasterize the visible triangles, and may perform coarse level depth tests. At 1016, the GPU may update the coarse depth buffer (e.g., LRZ buffer). At 1018, the GPU may determine whether each of the triangles is still visible after the depth test at 1014. For triangles that are invisible after the depth test at 1014, the GPU may, at 1022, mark these invisible triangles in the current frame as such and may update the first visibility stream accordingly. For triangles that remain visible after the depth test at 1014, at 1020, the GPU may perform bin level visibility tests. At 1022, the GPU may mark the remaining visible triangles in the current frame as such and may update the first visibility stream accordingly.

At 1102, the GPU may read the binning command stream. At 1104, the GPU may retrieve the visibility stream of the previous frame. At 1106, the GPU may determine whether each of the triangles was visible in the previous frame. For triangles that were invisible in the previous frame, at 1108, the GPU may read the geometry position data. At 1110, the GPU may perform triangle visibility tests (e.g., view frustrum tests, backface cull, scissor and zero pixel tests, etc.)

using the camera/viewport of the present frame. At 1112, the GPU may determine if each of triangles that were invisible in the previous frame has become visible in the current frame. The GPU may, at 1122, mark triangles that remain invisible in the current frame as such and may update a second visibility stream accordingly. For triangles that have become visible in the current frame, as identified at 1112, at 1114, the GPU may rasterize the visible triangles, and may perform coarse level depth tests. At 1116, the GPU may update the coarse depth buffer (e.g., LRZ buffer) from the first binning pass. At 1118, the GPU may determine whether each of the triangles are still visible after the depth test at 1114. For triangles that are invisible after the depth test at 1114, the GPU may, at 1122, mark these invisible triangles in the current frame as such and may update the second visibility stream accordingly. For triangles that remain visible after the depth test at 1114, at 1120, the GPU may perform bin level visibility tests. At 1122, the GPU may mark the remaining visible triangles in the current frame as such and may update the second visibility stream accordingly.

To perform the bin rendering pass, at 1202, the GPU may read the binning command stream. At 1204, the GPU may read the first visibility stream (e.g., as updated at 1022) and may read the second visibility stream (e.g., as updated at 1122). At 1206, the GPU may determine whether each of the triangles marked as visible in the first visibility stream or the second visibility stream is actually visible. At 1208, the GPU may read the geometry attribute data for the remaining visible triangles. At 1210, the GPU may render the bin, and may update the RT for each bin.

Accordingly, based on the various aspects of the disclosure describe above, workload may be reduced in terms of the bandwidth as well as the ALU instructions. The performance benefits may be especially pronounced for geometry heavy workloads.

Figure 13:
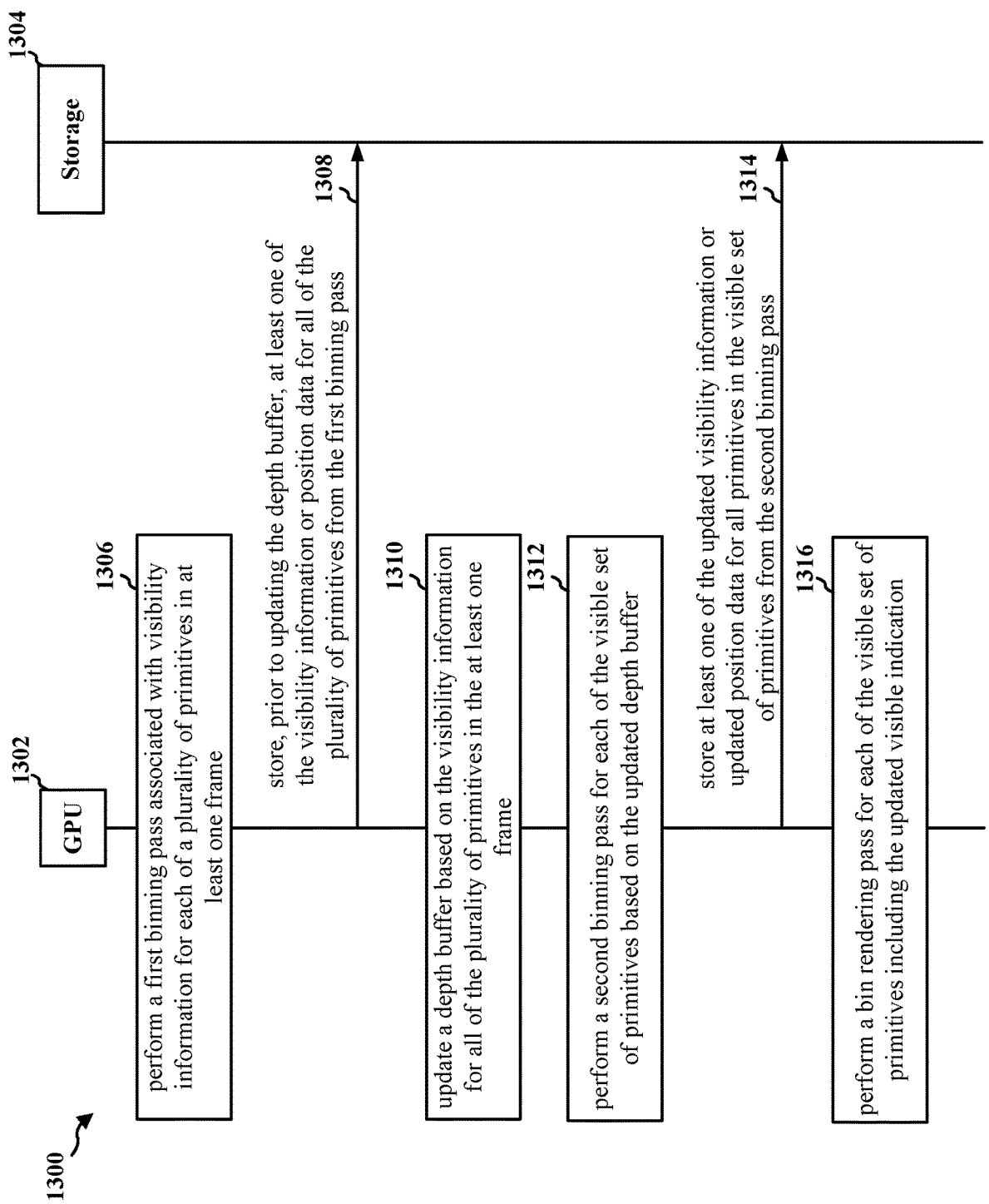
FIG. 13 is a call flow diagram illustrating example communications between a GPU and a storage in accordance with one or more techniques of this disclosure.

FIG. 13 is a call flow diagram 1300 illustrating example communications between a GPU and a storage in accordance with one or more techniques of this disclosure. At 1306, the GPU 1302 may perform a first binning pass associated with visibility information for each of a plurality of primitives in at least one frame. The visibility information for each of the plurality of primitives may correspond to a visible indication or an invisible indication. Each of the plurality of primitives with the visible indication may correspond to a visible set of primitives. Each of the plurality of primitives with the invisible indication may correspond to an invisible set of primitives.

In one configuration, each primitive in the plurality of primitives may correspond to a triangle.

At 1308, the GPU 1302 may store, prior to updating, at 1310, the depth buffer, at least one of the visibility information or position data for all of the plurality of primitives from the first binning pass into the storage 1304.

At 1310, the GPU 1302 may update a depth buffer based on the visibility information for all of the plurality of primitives in the at least one frame.

In one configuration, at least one of the visibility information or the position data for all of the plurality of primitives from the first binning pass may be stored, at 1310, in at least one of a GPU buffer, an on-chip buffer, or a system memory.

At 1312, the GPU 1302 may perform a second binning pass for each of the visible set of primitives based on the updated depth buffer. The second binning pass may be associated with updated visibility information for each primitive in the visible set of primitives. The updated visibility information for each primitive in the visible set of primitives may correspond to an updated visible indication or an updated invisible indication.

In one configuration, the first binning pass at 1306 may include a first visibility test that produces the visibility information for each of the plurality of primitives. The second binning pass at 1312 may include a second visibility test that produces the updated visibility information for each primitive in the visible set of primitives.

At 1314, the GPU 1302 may store at least one of the updated visibility information or updated position data for all primitives in the visible set of primitives from the second binning pass into the storage 1304.

In one configuration, at least one of the updated visibility information or the updated position data for all primitives in the visible set of primitives from the second binning pass may be stored in at least one of a GPU buffer, an on-chip buffer, or a system memory.

At 1316, the GPU 1302 may perform a bin rendering pass for each of the visible set of primitives including the updated visible indication. The bin rendering pass may be performed after storing at least one of the updated visibility information or the updated position data.

In one configuration, the at least one frame may include one or more of a current frame or a previous frame in a set of frames for a scene associated with the graphics processing.

In one configuration, the first binning pass at 1306 and the second binning pass at 1312 may be based on the visibility information for each of the plurality of primitives in the previous frame.

In one configuration, the at least one frame may be included in a scene associated with the graphics processing at a GPU 1302. The first binning pass at 1306 and the second binning pass at 1312 may be performed by the GPU 1302.

Figure 14:
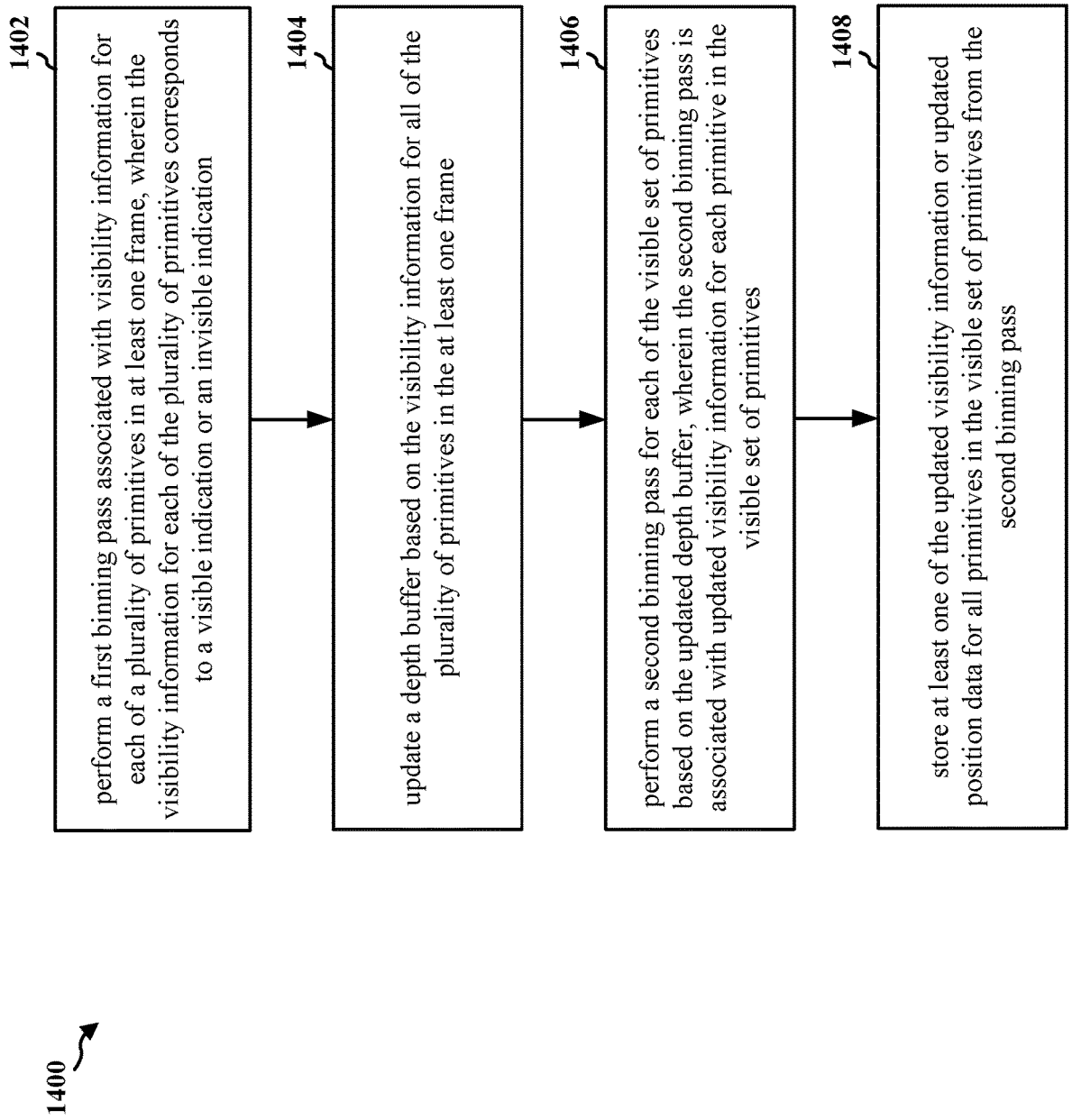
FIG. 14 is a flowchart of an example method of graphics processing in accordance with one or more techniques of this disclosure.

FIG. 14 is a flowchart 1400 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-13.

At 1402, the apparatus may perform a first binning pass associated with visibility information for each of a plurality of primitives in at least one frame. The visibility information for each of the plurality of primitives may correspond to a visible indication or an invisible indication. Each of the plurality of primitives with the visible indication may correspond to a visible set of primitives. Each of the plurality of primitives with the invisible indication may correspond to an invisible set of primitives. For example, referring to FIG. 13, at 1306, the GPU 1302 may perform a first binning pass associated with visibility information for each of a plurality of primitives in at least one frame. Further, 1402 may be performed by the processing unit 120 in FIG. 1.

At 1404, the apparatus may update a depth buffer based on the visibility information for all of the plurality of primitives in the at least one frame. For example, referring to FIG. 13, at 1310, the GPU 1302 may update a depth buffer based on the visibility information for all of the plurality of primitives in the at least one frame. Further, 1404 may be performed by the processing unit 120 in FIG. 1.

At 1406, the apparatus may perform a second binning pass for each of the visible set of primitives based on the updated depth buffer. The second binning pass may be associated with updated visibility information for each primitive in the visible set of primitives. The updated visibility information for each primitive in the visible set of primitives may correspond to an updated visible indication or an updated invisible indication. For example, referring to FIG. 13, at 1312, the GPU 1302 may perform a second binning pass for each of the visible set of primitives based on the updated depth buffer. Further, 1406 may be performed by the processing unit 120 in FIG. 1.

At 1408, the apparatus may store at least one of the updated visibility information or updated position data for all primitives in the visible set of primitives from the second binning pass. For example, referring to FIG. 13, at 1314, the GPU 1302 may store at least one of the updated visibility information or updated position data for all primitives in the visible set of primitives from the second binning pass (e.g., into the storage 1304). Further, 1408 may be performed by the processing unit 120 in FIG. 1.

Figure 15:
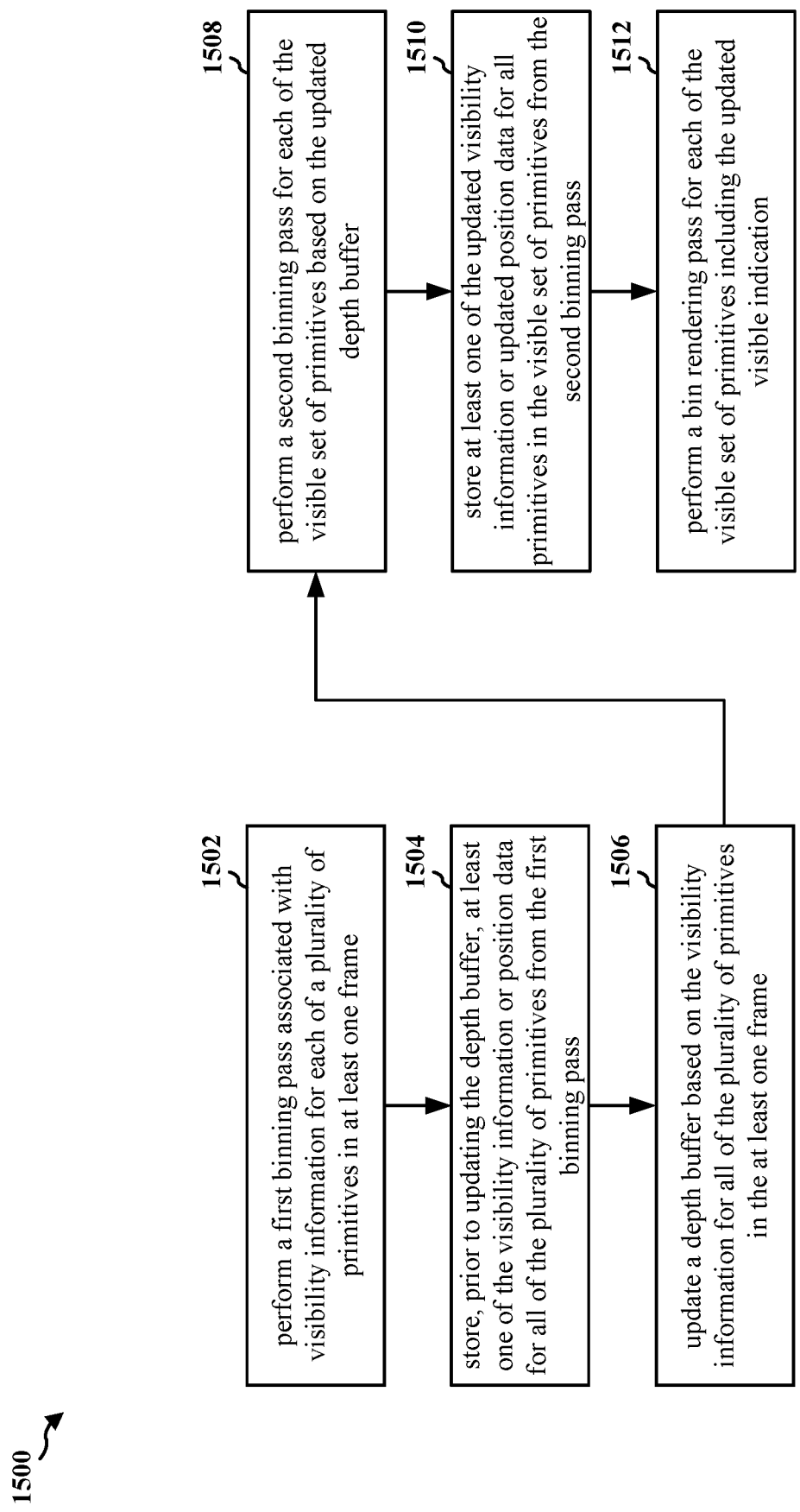
FIG. 15 is a flowchart of an example method of graphics processing in accordance with one or more techniques of this disclosure.

FIG. 15 is a flowchart 1500 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-13.

At 1502, the apparatus may perform a first binning pass associated with visibility information for each of a plurality of primitives in at least one frame. The visibility information for each of the plurality of primitives may correspond to a visible indication or an invisible indication. Each of the plurality of primitives with the visible indication may correspond to a visible set of primitives. Each of the plurality of primitives with the invisible indication may correspond to an invisible set of primitives. For example, referring to FIG. 13, at 1306, the GPU 1302 may perform a first binning pass associated with visibility information for each of a plurality of primitives in at least one frame. Further, 1502 may be performed by the processing unit 120 in FIG. 1.

At 1506, the apparatus may update a depth buffer based on the visibility information for all of the plurality of primitives in the at least one frame. For example, referring to FIG. 13, at 1310, the GPU 1302 may update a depth buffer based on the visibility information for all of the plurality of primitives in the at least one frame. Further, 1506 may be performed by the processing unit 120 in FIG. 1.

At 1508, the apparatus may perform a second binning pass for each of the visible set of primitives based on the updated depth buffer. The second binning pass may be associated with updated visibility information for each primitive in the visible set of primitives. The updated visibility information for each primitive in the visible set of primitives may correspond to an updated visible indication or an updated invisible indication. For example, referring to FIG. 13, at 1312, the GPU 1302 may perform a second binning pass for each of the visible set of primitives based on the updated depth buffer. Further, 1508 may be performed by the processing unit 120 in FIG. 1.

At 1510, the apparatus may store at least one of the updated visibility information or updated position data for all primitives in the visible set of primitives from the second binning pass. For example, referring to FIG. 13, at 1314, the GPU 1302 may store at least one of the updated visibility information or updated position data for all primitives in the visible set of primitives from the second binning pass (e.g., into the storage 1304). Further, 1510 may be performed by the processing unit 120 in FIG. 1.

In one configuration, at 1504, the apparatus may store, prior to updating the depth buffer, at least one of the visibility information or position data for all of the plurality of primitives from the first binning pass. For example, referring to FIG. 13, at 1308, the GPU 1302 may store, prior to updating, at 1310, the depth buffer, at least one of the visibility information or position data for all of the plurality of primitives from the first binning pass (e.g., into the storage 1304). Further, 1504 may be performed by the processing unit 120 in FIG. 1.

In one configuration, referring to FIG. 13, at least one of the visibility information or the position data for all of the plurality of primitives from the first binning pass may be stored, at 1310, in at least one of a GPU buffer, an on-chip buffer, or a system memory.

In one configuration, at 1512, the apparatus may perform a bin rendering pass for each of the visible set of primitives including the updated visible indication. The bin rendering pass may be performed after storing at least one of the updated visibility information or the updated position data. For example, referring to FIG. 13, at 1308, the GPU 1302 may store, prior to updating, at 1316, the GPU 1302 may perform a bin rendering pass for each of the visible set of primitives including the updated visible indication. Further, 1512 may be performed by the processing unit 120 in FIG. 1.

In one configuration, each primitive in the plurality of primitives may correspond to a triangle.

In one configuration, referring to FIG. 13, the first binning pass at 1306 may include a first visibility test that produces the visibility information for each of the plurality of primitives. The second binning pass at 1312 may include a second visibility test that produces the updated visibility information for each primitive in the visible set of primitives.

In one configuration, at least one of the updated visibility information or the updated position data for all primitives in the visible set of primitives from the second binning pass may be stored in at least one of a GPU buffer, an on-chip buffer, or a system memory.

In one configuration, the at least one frame may include one or more of a current frame or a previous frame in a set of frames for a scene associated with the graphics processing.

In one configuration, referring to FIG. 13, the first binning pass at 1306 and the second binning pass at 1312 may be based on the visibility information for each of the plurality of primitives in the previous frame.

In one configuration, referring to FIG. 13, the at least one frame may be included in a scene associated with the graphics processing at a GPU 1302. The first binning pass at 1306 and the second binning pass at 1312 may be performed by the GPU 1302.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for performing a first binning pass associated with visibility information for each of a plurality of primitives in at least one frame. The visibility information for each of the plurality of primitives may correspond to a visible indication or an invisible indication. Each of the plurality of primitives with the visible indication may correspond to a visible set of primitives. Each of the plurality of primitives with the invisible indication may correspond to an invisible set of primitives. The apparatus may further include means for updating a depth buffer based on the visibility information for all of the plurality of primitives in the at least one frame. The apparatus may further include means for performing a second binning pass for each of the visible set of primitives based on the updated depth buffer. The second binning pass may be associated with updated visibility information for each primitive in the visible set of primitives. The updated visibility information for each primitive in the visible set of primitives may correspond to an updated visible indication or an updated invisible indication. The apparatus may further include means for storing at least one of the updated visibility information or updated position data for all primitives in the visible set of primitives from the second binning pass. In one configuration, the apparatus may further include means for storing, prior to updating the depth buffer, at least one of the visibility information or position data for all of the plurality of primitives from the first binning pass. In one configuration, at least one of the visibility information or the position data for all of the plurality of primitives from the first binning pass may be stored in at least one of a GPU buffer, an on-chip buffer, or a system memory. In one configuration, the apparatus may further include means for performing a bin rendering pass for each of the visible set of primitives including the updated visible indication. The bin rendering pass may be performed after storing at least one of the updated visibility information or the updated position data. In one configuration, each primitive in the plurality of primitives may correspond to a triangle. In one configuration, the first binning pass may include a first visibility test that produces the visibility information for each of the plurality of primitives The second binning pass may include a second visibility test that produces the updated visibility information for each primitive in the visible set of primitives. In one configuration, at least one of the updated visibility information or the updated position data for all primitives in the visible set of primitives from the second binning pass may be stored in at least one of a GPU buffer, an on-chip buffer, or a system memory. In one configuration, the at least one frame may include one or more of a current frame or a previous frame in a set of frames for a scene associated with the graphics processing. In one configuration, the first binning pass and the second binning pass may be based on the visibility information for each of the plurality of primitives in the previous frame. In one configuration, the at least one frame may be included in a scene associated with the graphics processing at a GPU. The first binning pass and the second binning pass may be performed by the GPU.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, including: performing a first binning pass associated with visibility information for each of a plurality of primitives in at least one frame, where the visibility information for each of the plurality of primitives corresponds to a visible indication or an invisible indication, where each of the plurality of primitives with the visible indication corresponds to a visible set of primitives, where each of the plurality of primitives with the invisible indication corresponds to an invisible set of primitives; updating a depth buffer based on the visibility information for all of the plurality of primitives in the at least one frame; performing a second binning pass for each of the visible set of primitives based on the updated depth buffer, where the second binning pass is associated with updated visibility information for each primitive in the visible set of primitives, where the updated visibility information for each primitive in the visible set of primitives corresponds to an updated visible indication or an updated invisible indication; and storing at least one of the updated visibility information or updated position data for all primitives in the visible set of primitives from the second binning pass.

Aspect 2 may be combined with aspect 1 and further includes storing, prior to updating the depth buffer, at least one of the visibility information or position data for all of the plurality of primitives from the first binning pass.

Aspect 3 may be combined with aspect 2 and includes that at least one of the visibility information or the position data for all of the plurality of primitives from the first binning pass is stored in at least one of a GPU buffer, an on-chip buffer, or a system memory.

Aspect 4 may be combined with any of aspects 1-3 and further includes performing a bin rendering pass for each of the visible set of primitives including the updated visible indication, where the bin rendering pass is performed after storing at least one of the updated visibility information or the updated position data.

Aspect 5 may be combined with any of aspects 1-4 and includes that each primitive in the plurality of primitives corresponds to a triangle.

Aspect 6 may be combined with any of aspects 1-5 and includes that the first binning pass includes a first visibility test that produces the visibility information for each of the plurality of primitives, and where the second binning pass includes a second visibility test that produces the updated visibility information for each primitive in the visible set of primitives.

Aspect 7 may be combined with any of aspects 1-6 and includes that at least one of the updated visibility information or the updated position data for all primitives in the visible set of primitives from the second binning pass is stored in at least one of a GPU buffer, an on-chip buffer, or a system memory.

Aspect 8 may be combined with any of aspects 1-7 and includes that the at least one frame includes one or more of a current frame or a previous frame in a set of frames for a scene associated with the graphics processing.

Aspect 9 may be combined with aspect 8 and includes that the first binning pass and the second binning pass are based on the visibility information for each of the plurality of primitives in the previous frame.

Aspect 10 may be combined with any of aspects 1-9 and includes that the at least one frame is included in a scene associated with the graphics processing at a GPU, where the first binning pass and the second binning pass are performed by the GPU.

Aspect 11 is an apparatus for graphics processing including at least one processor coupled to a memory and, based at least in part on information stored in the memory, the at least one processor is configured to implement a method as in any of aspects 1-10.

Aspect 12 may be combined with aspect 11 and further includes a transceiver, where the apparatus is a wireless communication device.

Aspect 13 is an apparatus for graphics processing including means for implementing a method as in any of aspects 1-10.

Aspect 14 is a computer-readable medium (e.g., a non-transitory computer-readable medium) storing computer executable code, the code when executed by at least one processor causes the at least one processor to implement a method as in any of aspects 1-10.

Various aspects have been described herein. These and other aspects are within the scope of the following claims.

What is claimed is:

1. An apparatus for graphics processing, comprising:
a memory; and
at least one processor coupled to the memory and, based at least in part on information stored in the memory, the at least one processor is configured to:
perform a first binning pass associated with visibility information for each of a plurality of primitives in at least one frame, wherein the visibility information for each of the plurality of primitives corresponds to a visible indication or an invisible indication, wherein each of the plurality of primitives with the visible indication corresponds to a visible set of primitives, wherein each of the plurality of primitives with the invisible indication corresponds to an invisible set of primitives, wherein the first binning pass includes a first visibility test that produces the visibility information for each of the plurality of primitives;
update a depth buffer based on the visibility information for all of the plurality of primitives in the at least one frame;
perform a second binning pass for each of the visible set of primitives based on the updated depth buffer, wherein the second binning pass is associated with updated visibility information for each primitive in the visible set of primitives, wherein the updated visibility information for each primitive in the visible set of primitives corresponds to an updated visible indication or an updated invisible indication, wherein the second binning pass includes a second visibility test that produces the updated visibility information for each primitive in the visible set of primitives; and store at least one of the updated visibility information or updated position data for all primitives in the visible set of primitives from the second binning pass.

2. The apparatus of claim 1, wherein the at least one processor is further configured to:
store, prior to updating the depth buffer, at least one of the visibility information or position data for all of the plurality of primitives from the first binning pass.

3. The apparatus of claim 2, wherein to store at least one of the visibility information or the position data for all of the plurality of primitives from the first binning pass, the at least one processor is configured to:
store at least one of the visibility information or the position data for all of the plurality of primitives from the first binning pass in at least one of a graphics processing unit (GPU) buffer, an on-chip buffer, or a system memory.

4. The apparatus of claim 1, wherein the at least one processor is further configured to:
perform a bin rendering pass for each of the visible set of primitives including the updated visible indication, wherein the bin rendering pass is performed after storing at least one of the updated visibility information or the updated position data.

5. The apparatus of claim 1, wherein each primitive in the plurality of primitives corresponds to a triangle.

6. The apparatus of claim 1, wherein to store at least one of the updated visibility information or the updated position data for all primitives in the visible set of primitives from the second binning pass, the at least one processor is configured to:
store at least one of the updated visibility information or the updated position data for all primitives in the visible set of primitives from the second binning pass in at least one of a graphics processing unit (GPU) buffer, an on-chip buffer, or a system memory.

7. The apparatus of claim 1, wherein the at least one frame includes one or more of a current frame or a previous frame in a set of frames for a scene associated with the graphics processing.

8. The apparatus of claim 7, wherein the first binning pass and the second binning pass are based on the visibility information for each of the plurality of primitives in the previous frame.

9. The apparatus of claim 1, wherein the at least one frame is included in a scene associated with the graphics processing at a graphics processing unit (GPU), wherein the first binning pass and the second binning pass are performed by the GPU.

10. The apparatus of claim 1, wherein the apparatus is a wireless communication device.

11. A method of graphics processing, comprising:
performing a first binning pass associated with visibility information for each of a plurality of primitives in at least one frame, wherein the visibility information for each of the plurality of primitives corresponds to a visible indication or an invisible indication, wherein each of the plurality of primitives with the visible indication corresponds to a visible set of primitives, wherein each of the plurality of primitives with the invisible indication corresponds to an invisible set of primitives, wherein the first binning pass includes a first visibility test that produces the visibility information for each of the plurality of primitives;
updating a depth buffer based on the visibility information for all of the plurality of primitives in the at least one frame;
performing a second binning pass for each of the visible set of primitives based on the updated depth buffer, wherein the second binning pass is associated with updated visibility information for each primitive in the visible set of primitives, wherein the updated visibility information for each primitive in the visible set of primitives corresponds to an updated visible indication or an updated invisible indication, wherein the second binning pass includes a second visibility test that produces the updated visibility information for each primitive in the visible set of primitives; and
storing at least one of the updated visibility information or updated position data for all primitives in the visible set of primitives from the second binning pass.

12. The method of claim 11, further comprising:
storing, prior to updating the depth buffer, at least one of the visibility information or position data for all of the plurality of primitives from the first binning pass.

13. The method of claim 12, wherein at least one of the visibility information or the position data for all of the plurality of primitives from the first binning pass is stored in at least one of a graphics processing unit (GPU) buffer, an on-chip buffer, or a system memory.

14. The method of claim 11, further comprising:
performing a bin rendering pass for each of the visible set of primitives including the updated visible indication, wherein the bin rendering pass is performed after storing at least one of the updated visibility information or the updated position data.

15. The method of claim 11, wherein each primitive in the plurality of primitives corresponds to a triangle.

16. The method of claim 11, wherein at least one of the updated visibility information or the updated position data for all primitives in the visible set of primitives from the second binning pass is stored in at least one of a graphics processing unit (GPU) buffer, an on-chip buffer, or a system memory.

17. The method of claim 11, wherein the at least one frame includes one or more of a current frame or a previous frame in a set of frames for a scene associated with the graphics processing.

18. The method of claim 17, wherein the first binning pass and the second binning pass are based on the visibility information for each of the plurality of primitives in the previous frame.

19. The method of claim 11, wherein the at least one frame is included in a scene associated with the graphics processing at a graphics processing unit (GPU), wherein the first binning pass and the second binning pass are performed by the GPU.

20. A non-transitory computer-readable medium storing computer executable code, the code when executed by at least one processor, causes the at least one processor to:
perform a first binning pass associated with visibility information for each of a plurality of primitives in at least one frame, wherein the visibility information for each of the plurality of primitives corresponds to a visible indication or an invisible indication, wherein each of the plurality of primitives with the visible indication corresponds to a visible set of primitives, wherein each of the plurality of primitives with the invisible indication corresponds to an invisible set of primitives, wherein the first binning pass includes a first visibility test that produces the visibility information for each of the plurality of primitives;
update a depth buffer based on the visibility information for all of the plurality of primitives in the at least one frame;
perform a second binning pass for each of the visible set of primitives based on the updated depth buffer, wherein the second binning pass is associated with updated visibility information for each primitive in the visible set of primitives, wherein the updated visibility information for each primitive in the visible set of primitives corresponds to an updated visible indication or an updated invisible indication, wherein the second binning pass includes a second visibility test that produces the updated visibility information for each primitive in the visible set of primitives; and
store at least one of the updated visibility information or updated position data for all primitives in the visible set of primitives from the second binning pass.

21. The non-transitory computer-readable medium of claim 20, the code further causing the at least one processor to:
store, prior to updating the depth buffer, at least one of the visibility information or position data for all of the plurality of primitives from the first binning pass.

22. The non-transitory computer-readable medium of claim 21, wherein at least one of the visibility information or the position data for all of the plurality of primitives from the first binning pass is stored in at least one of a graphics processing unit (GPU) buffer, an on-chip buffer, or a system memory.

23. The non-transitory computer-readable medium of claim 20, the code further causing the at least one processor to:
perform a bin rendering pass for each of the visible set of primitives including the updated visible indication, wherein the bin rendering pass is performed after storing at least one of the updated visibility information or the updated position data.

24. The non-transitory computer-readable medium of claim 20, wherein each primitive in the plurality of primitives corresponds to a triangle.

25. The non-transitory computer-readable medium of claim 20, wherein at least one of the updated visibility information or the updated position data for all primitives in the visible set of primitives from the second binning pass is stored in at least one of a graphics processing unit (GPU) buffer, an on-chip buffer, or a system memory.

26. The non-transitory computer-readable medium of claim 20, wherein the at least one frame includes one or more of a current frame or a previous frame in a set of frames for a scene associated with graphics processing.

27. The non-transitory computer-readable medium of claim 26, wherein the first binning pass and the second binning pass are based on the visibility information for each of the plurality of primitives in the previous frame.

* * * * *